(12) United States Patent
Hung et al.

(10) Patent No.: US 8,797,746 B2
(45) Date of Patent: Aug. 5, 2014

(54) INTERFACE CARD QUICK PLUG-AND-UNPLUG DEVICE

(75) Inventors: Shen Jung Hung, New Taipei (TW); Cheng Chun Chang, New Taipei (TW); Ya Wen Cheng, New Taipei (TW)

(73) Assignee: Innodisk Corporation, New Taipei (TW)

( * ) Notice: Subject to any disclaimer, the term of this patent is extended or adjusted under 35 U.S.C. 154(b) by 707 days.

(21) Appl. No.: 13/107,204

(22) Filed: May 13, 2011

(65) Prior Publication Data

US 2011/0289251 A1    Nov. 24, 2011

(30) Foreign Application Priority Data

May 21, 2010    (TW) .............................. 099116254 A

(51) Int. Cl.
*H05K 1/14*    (2006.01)
*G06F 13/40*    (2006.01)

(52) U.S. Cl.
CPC .................................. *G06F 13/409* (2013.01)
USPC ........... 361/736; 361/740; 361/737; 710/301; 710/302; 710/304

(58) Field of Classification Search
CPC .............. G06F 13/4081; G06F 13/409; G06F 13/4063; G06F 1/185; G06F 1/1632; G06F 1/184; G06F 1/186; H05K 7/1409; H05K 7/1418; H05K 7/1405; H05K 7/1461; H01R 24/62; H01R 12/7017
USPC ........... 361/736, 737, 740; 710/301, 302, 304
See application file for complete search history.

(56) References Cited

U.S. PATENT DOCUMENTS 5,383,793 A * 1/1995 Hsu et al. ...................... 439/327

* cited by examiner

*Primary Examiner* — Robert J Hoffberg
*Assistant Examiner* — Hung Dang
(74) *Attorney, Agent, or Firm* — Chun-Ming Shih

(57) ABSTRACT

An interface card quick plug-and-unplug device for use with a PCIe interface card is disclosed to include a shell covering a part of the PCIe interface card, and a locating member disposed at one side of the shell and/or the PCIe interface card for engagement with the PCIe slot upon insertion of the PCIe interface card into the PCIe slot. Biasing the locating member allows quick removal of the PCIe interface card from the PCIe slot without any tool. The interface card quick plug-and-unplug device enhances the flexibility of the design of computer circuit layout.

10 Claims, 11 Drawing Sheets

INTERFACE CARD QUICK PLUG-AND-UNPLUG DEVICE

BACKGROUND OF THE INVENTION

The present invention relates to an interface card quick plug-and-unplug device and more particularly, to an interface card quick plug-and-unplug device for quick plugging and unplugging of a PCIe or PCI interface card.

Since the invention of PCI (Peripheral Component Interconnect) bus in 1990 by Intel, PCI bus has become the most commonly used extension bus in computer systems. Further, following development of technology, PCI-X or PCIe (Peripheral Component Interconnect Express) was created and designed to replace the older PCL and AGP bus standards. PCIe has the advantages of higher maximum system bus throughput, lower I/O pin count and smaller physical footprint, better performance-scaling for bus devices.

FIG. 1 illustrates a conventional PCIe package. As illustrated, the PCIe package 11 includes a PCIe interface card 111 and a baffle 113. The PCIe interface card 111 is for insertion into a PCIe slot 131.

In a computer system, the motherboard 13 comprises at least one PCIe slot 131. When a PCIe interface card 111 is inserted into one PCIe slot 131 of the motherboard 13, the motherboard 13 and transmits data or signal to the PCIe interface card 111 via the PCIe slot 131.

The PCIe interface card 111 has one side edge provided with a baffle 113. After insertion of the PCIe interface card 111 into the PCIe slot 131, the baffle 113 is forced into contact with the computer case 15. At this time, screws 17 are used to affix the baffle 113 to the computer case 15, locking the PCIe package 11 to the PCIe slot 131.

By means of the baffle 113 and the screws 17, the PCIe package 11 is firmly secured to the PCIe slot 131 and the computer case 15. However, this installation method is not convenient. For example, when the user is going to install the PCIe package 11, the user must insert the PCIe interface card 111 into the PCIe slot 131 and micro-adjust the position of the PCIe package 11 to align the baffle 113 of the PCIe package 11 with the computer case 15, and then affix the baffle 113 to the computer case 15 with the screws 17.

During installation, the user needs to prepare a hand tool, for example, screwdriver for fastening the screws 17. Further, when dismounting the PCIe package 11, the user needs also use a hand tool to remove the screws 17 from the baffle 113 and the computer case 15 for allowing removal of the PCIe package 11 from the PCIe slot 131. This unplugging operation is complicated.

Further, the baffle 113 of the PCIe package 11 is configured subject to a predetermined specification, for example, 121 mm for a standard baffle or 79.4 mm for a short baffle. Thus, the size of the baffle 113 is not adjustable subject to the height H of the PCIe interface card 111. In consequence, the dimension of the PCIe package 11 cannot be minimized. Because the height H of the PCIe package 11 and the height of the computer case 15 are not freely adjustable to fit different circuit layout designs for computers having light, thin, short and small characteristics.

Further, the aforesaid PCIe package 11 simply has one baffle 113 disposed at one lateral side thereof for fixation to the computer case 15. If the length W of the PCIe package 11 is relatively shorter, the PCIe package 11 may be loosened upon accidental vibration of the computer system, resulting in interruption of data transmission of the PCIe interface card 111 or computer failure.

Further, because the PCIe package 11 is affixed to the computer case 15 via the baffle 113, the location of the PCIe slot 131 on the motherboard 13 is constrained. Because the location of the PCIe slot 131 must match the position of the baffle 113 in the computer case 15, the distance L between the PCIe slot 131 and the computer case 15 shall be strictly defined, or the PCIe package 11 will not be afffixable to the computer case 15. Thus, when the designer is designing the motherboard 13, the designer cannot freely change the location of the PCIe slot 131, limiting the flexibility of the design of the circuit layout and the use of the surface of the motherboard 13.

SUMMARY OF THE PRESENT INVENTION

It is, therefore, the primary purpose of the present invention to provide an interface card quick plug-and-unplug device, which eliminates the drawbacks of a conventional PCIe/PCI package, facilitating plugging and unplugging a PCIe/PCI interface card and enhancing the flexibility of the design of computer circuit layout.

It is, therefore, the second purpose of the present invention to provide an interface card quick plug-and-unplug device, which automatically clamps the PCIe slot upon insertion of the PCIe interface card, enhancing connection stability between the PCIe interface card and the PCIe slot.

It is, therefore, the second purpose of the present invention to provide an interface card quick plug-and-unplug device, which substitutes for the conventional baffle for computer and the positioning function of the computer baffle, allowing quick and convenient installation of a PCIe interface card without any tool and eliminating the drawback of the use of a conventional computer baffle.

It is, therefore, the third purpose of the present invention to provide an interface card quick plug-and-unplug device, which facilitates quick installation of a PCIe interface card in a PCIe slot without using a baffle, enhancing the flexibility of computer circuit layout and facilitating the fabrication of a computer system/PCIe package having light, thin, short and small characteristics.

It is, therefore, the fourth purpose of the present invention to provide an interface card quick plug-and-unplug device, which automatically clamps on one side of the PCI slot upon insertion of the PCI interface card, enhancing connection stability between the PCI interface card and the PCI slot and facilitating plugging and unplugging of the PCI interface card.

To achieve the previous mentioned objects, the present invention to provide an interface card quick plug-and-unplug device comprising: at least one locating member, each said locating member comprising a connection means connected with a PCIe interface card and an open space defined between said locating member and said PCIe interface card above said connection means; and a contact means located on a bottom side of said locating member for engagement with a PCIe slot upon insertion of said PCIe interface card into said PCIe slot.

Further, the present invention to provide an interface card quick plug-and-unplug device, comprising: at least one locating member, each said locating member comprising a connection means connected with a PCI interface card and an open space defined between said locating member and said PCI interface card above said connection means; and a contact means located on a bottom side of said locating member for engagement with a PCI slot upon insertion of said PCI interface card into said PCI slot.

DETAILED DESCRIPTION OF THE PREFERRED EMBODIMENTS

Figure 2A:
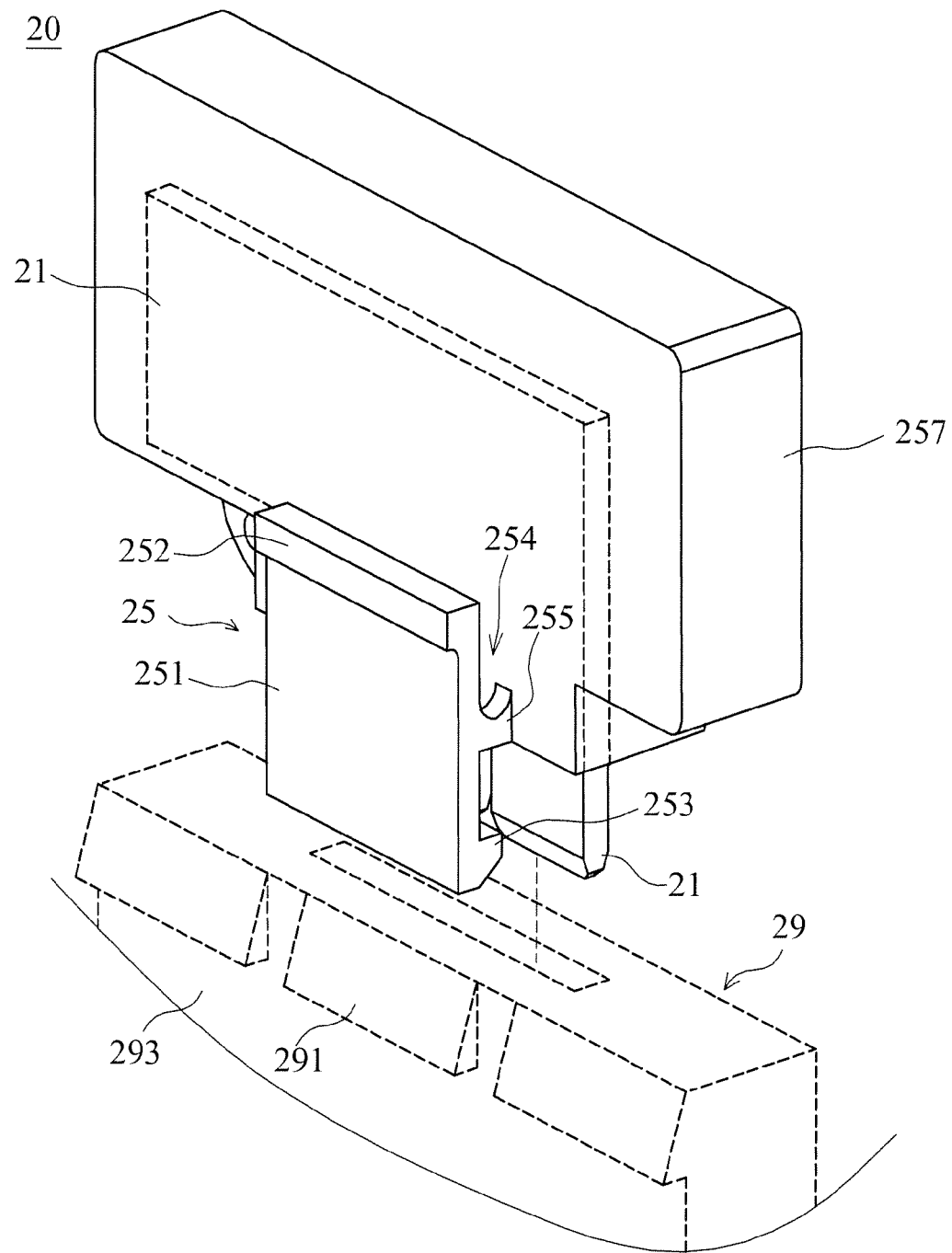
FIG. 2A is a perspective view of an interface card quick plug-and-unplug device in accordance with a first embodiment of the present invention.
Figure 2:
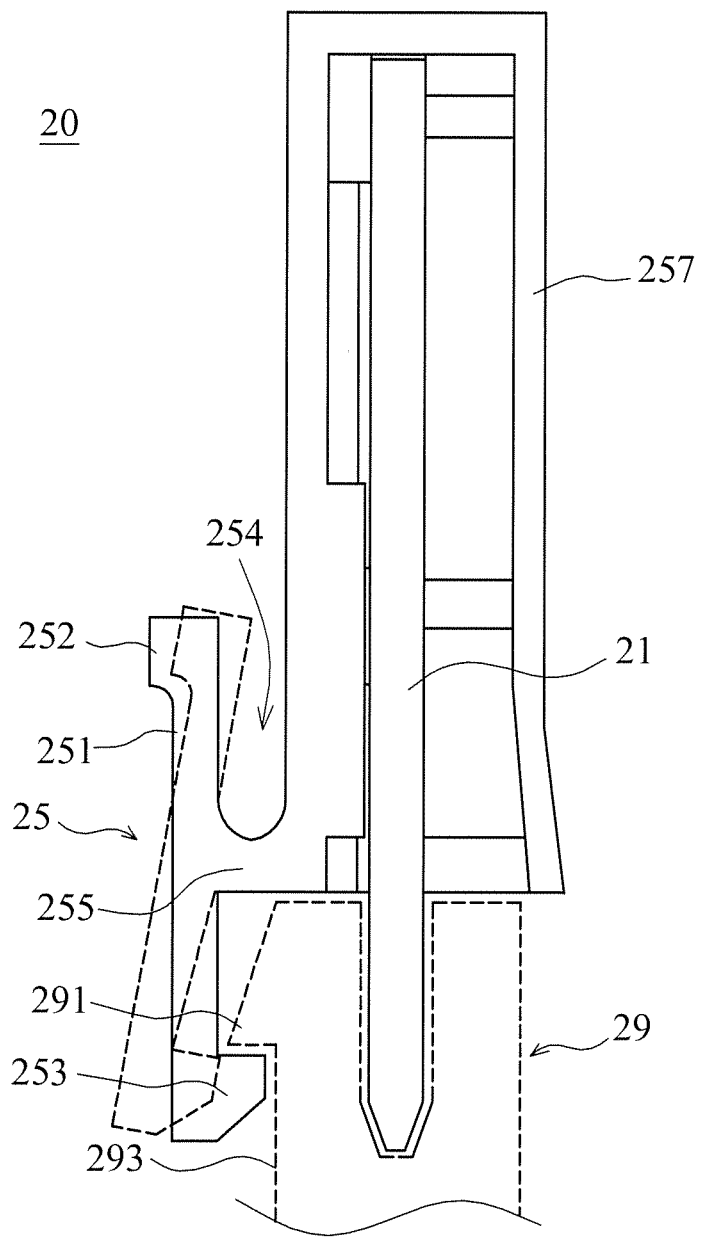
FIG. 2B is a schematic applied view of the first embodiment of the present invention, illustrating a plugging/unplugging operation of the interface card quick plug-and-unplug device.

Please refer to FIG. 2A and FIG. 2B. The present invention provides an interface card quick plug-and-unplug device 25 for use with a PCIe interface card 21 to form a PCIe package 20.

The interface card quick plug-and-unplug device 25 is mounted around a PCIe interface card 21, comprising a locating member 251. When inserting the PCIe interface card 21 into a PCIe slot 29, the locating member 251 engages or is clamped on one side wall 293 of the PCIe slot 29, enhancing the stability of the connection between the PCIe interface card 21 and the PCIe slot 29.

According to this embodiment, the interface card quick plug-and-unplug device 25 further comprises a shell 257 adapted for surrounding the PCIe interface card 21, allowing a part of the PCIe interface card 21 to be disposed outside the shell 257. When in use, the exposed part of the PCIe interface card 21 is inserted into the PCIe slot 29, allowing the PCIe interface card 21 to transmit data or signal via the PCIe slot 29.

The locating member 251 of the interface card quick plug-and-unplug device 25 is disposed outside the shell 257 and connected thereto by a connection means 255. The connection means 255 can be a soldering joint, a lock joint, a bonding joint, a snap-in joint, or an integral part between the locating member 251 and the shell 257. The connection means 255 is located on a middle part of the locating member 251. The locating member 251 comprises a press portion 252 located on the top side thereof, and contact means, for example, engagement member 253 located on the bottom side thereof. According to this embodiment, the engagement member 253 extends in direction toward the PCIe interface card 21 for contact with the side wall 293 of the PCIe slot 29. Further, the press portion 252 and connection means 255 of the locating member 251 and the shell 257 surround an open space 254.

During application, the user can press the press portion 252 of the interface card quick plug-and-unplug device 25 toward the open space 254 to extend the tilting angle of the locating member 251, as indicated by the imaginary line in FIG. 2B. After insertion of the PCIe interface card 21 into the PCIe slot 29, release the pressure from the press portion 252 of the interface card quick plug-and-unplug device 25, enabling the engagement member 253 to engage or clamp on the side wall 293 of the PCIe slot 29.

In actual practice, the user can directly insert the PCIe interface card 21 into the PCIe slot 29 without pressing the press portion 252, moving the engagement member 253 of the locating member 251 along the periphery of the PCIe slot 29 into positive engagement with the side wall 293 of the PCIe slot 29.

Further, the PCIe slot 29 has a protruding block 291 raised from the side wall 293. This protruding block 291 is commonly seen in regular PCIe slot designs. The invention fully utilizes this protruding block 291. When inserting the PCIe interface card 21 into the PCIe slot 29, the engagement member 253 of the locating member 251 will be forced into engagement with the protruding block 291 of the PCIe slot 29, enhancing connection stability between the PCIe interface card 21 and the PCIe slot 29. On the contrary, when going to unplug the PCIe interface card 21 from the PCIe slot 29, press the press portion 252 to bias the locating member 251 in disengaging the engagement member 253 of the locating member 251 from the protruding block 291, and then pull the PCIe package 20 out of the PCIe slot 29. As the interface card quick plug-and-unplug device 25 enables the PCIe interface card 21 to be quickly plugged into or unplugged from the PCIe slot 29 without the use of a screwdriver or any hand tool, the invention facilitates quick plugging and unplugging of the PCIe interface card 21.

Figure 3A:
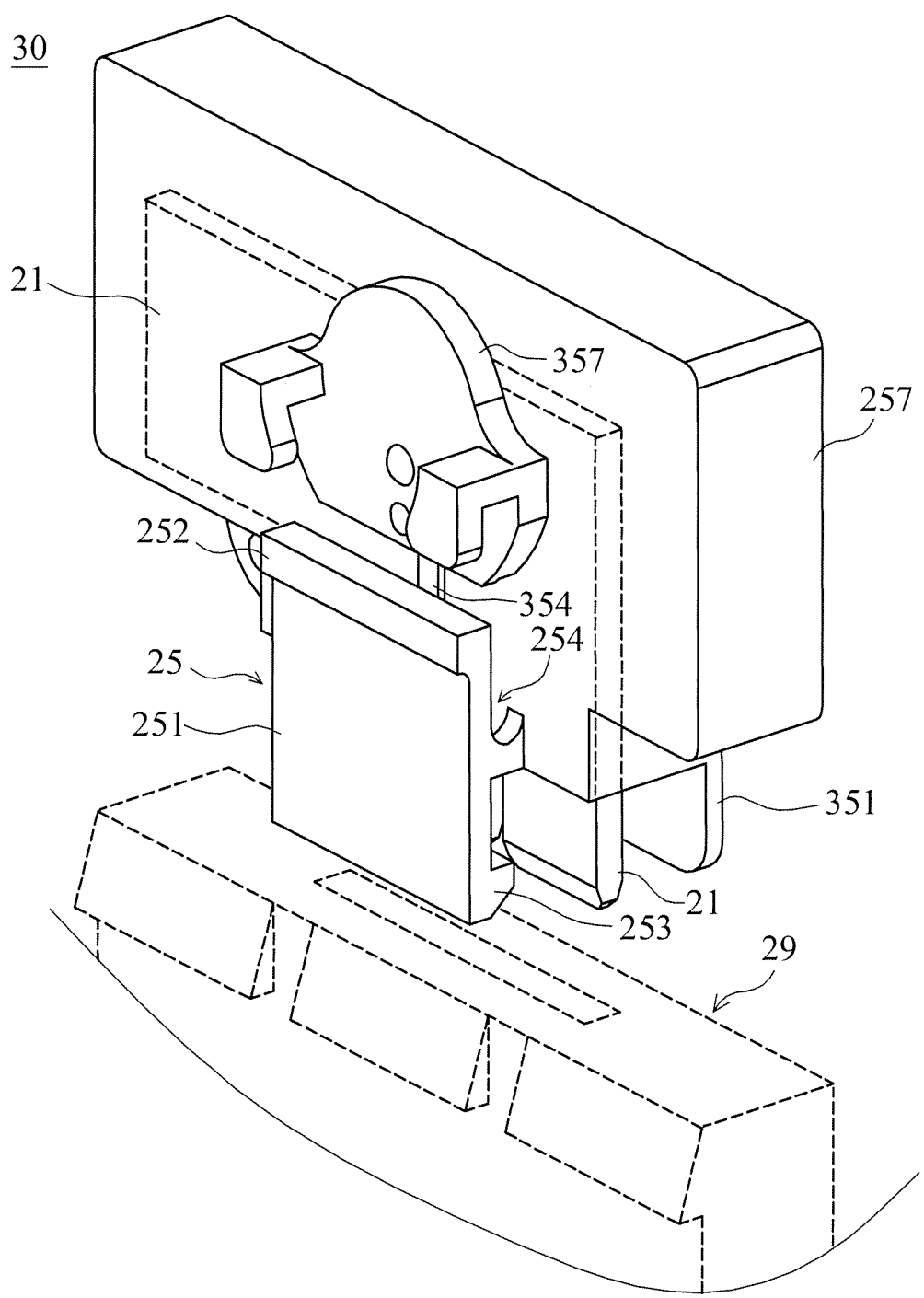
FIG. 3A is a perspective view of an interface card quick plug-and-unplug device in accordance with a second embodiment of the present invention.
Figure 3:
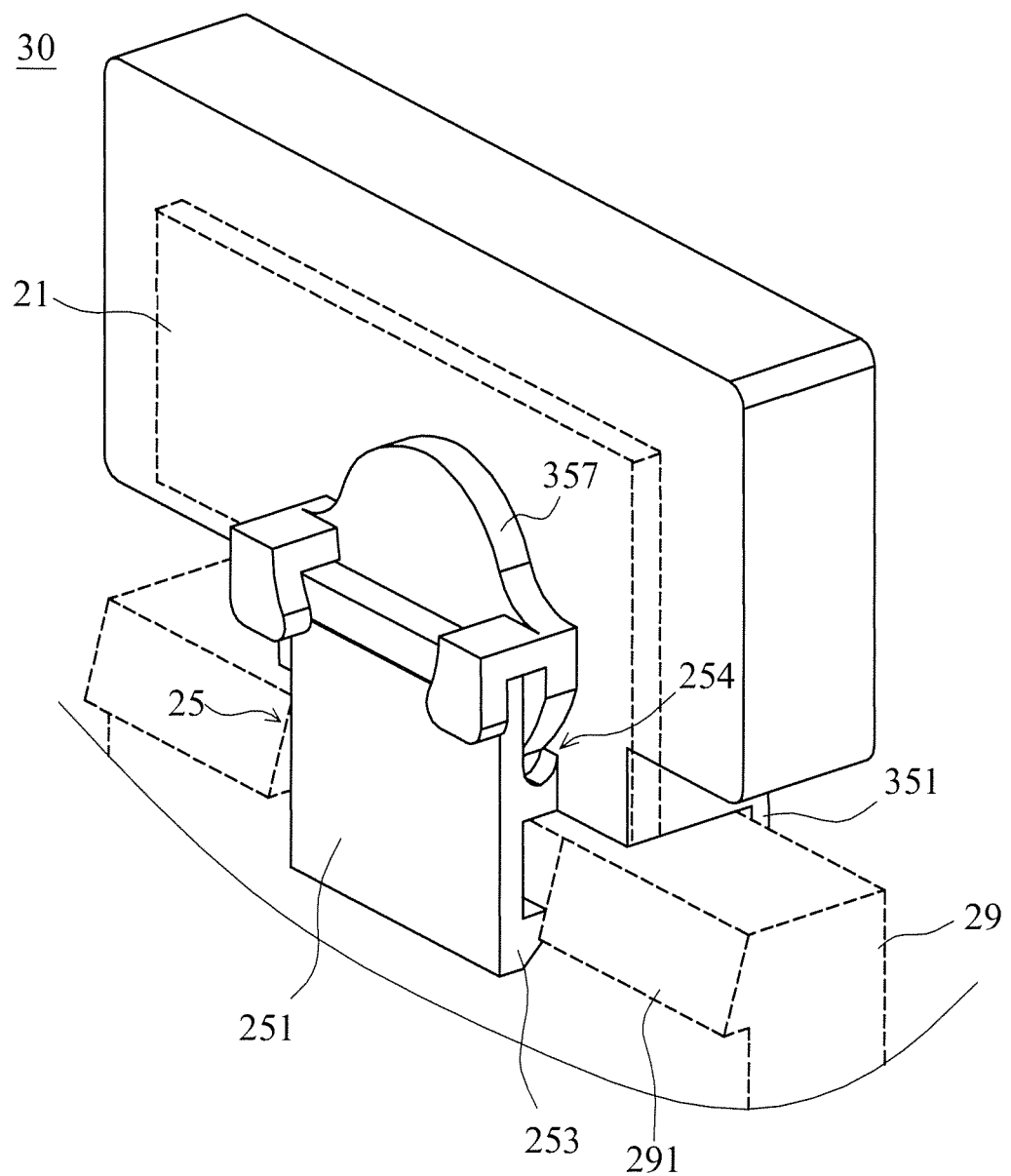
FIG. 3B is a schematic applied view of the second embodiment of the present invention, illustrating the interface card quick plug-and-unplug device installed in a PCIe slot.

FIGS. 3A and 3B illustrate an interface card quick plug-and-unplug device 25 in accordance with a second embodiment of the present invention, which is used with a PCIe interface card 21 to constitute a PCIe package 30. As illustrated, the interface card quick plug-and-unplug device 25 comprises a locating member 251 connected to one sidewall of the shell 257 thereof the shell 257 has a bottom extension 351 downwardly extended from an opposite sidewall thereof. When inserting the PCIe interface card 21 of the PCIe packet 30 into a PCIe slot 29, the locating member 251 and the bottom extension 351 will be respectively forced into contact with the two opposing sidewalls of the PCIe slot 29, enhancing connection stability between the PCIe package 30 and the PCIe slot 29.

According to this second embodiment, the interface card quick plug-and-unplug device 25 further comprises a positioning member 357 detachably mountable in the open space 254.

Before insertion of the PCIe interface card 21 of the PCIe packet 30 into the PCIe slot 29, the positioning member 357 must be detached from the interface card quick plug-and-unplug device 25 so that the user can press the press portion 252 to bias the locating member 251 relative to the shell 257 for quick insertion of the PCIe interface card 21 into the PCIe slot 29, as shown in FIG. 3A.

After insertion of the PCIe interface card 21 of the PCIe packet 30 into the PCIe slot 29 and engagement between the interface card quick plug-and-unplug device 25 and the PCIe slot 29, insert the positioning member 357 into the open space 254 between the locating member 251 and the shell 257 to prohibit biasing of the locating member 251 relative to the shell 257, enhancing connection stability between the PCIe interface card 21 and the PCIe slot 29, as shown in FIG. 3B.

Further, the shell 257 comprises a guide rail 354 vertically located on one sidewall thereof corresponding to the open space 254. The positioning member 357 can be coupled to and moved along the guide rail 354. After insertion of the PCIe interface card 21 of the PCIe packet 30 into the PCIe slot 29, the user can move the positioning member 357 downwardly along the guide rail 354 into the open space 254. On the contrary, when going to unplug the PCIe interface card 21 from the PCIe slot 29, move the positioning member 357 upwardly along the guide rail 354, and then press the press portion 252 to disengage the engagement member 253 from the PCIe slot 29, allowing removal of the PCIe interface card 21 from the PCIe slot 29. In another alternate form of the present invention, the positioning member 357 and/or guide rail 354 can be arranged at the left and right sides of the locating member 251, enabling the positioning member 357 to lock the locating member 251.

Figure 1:
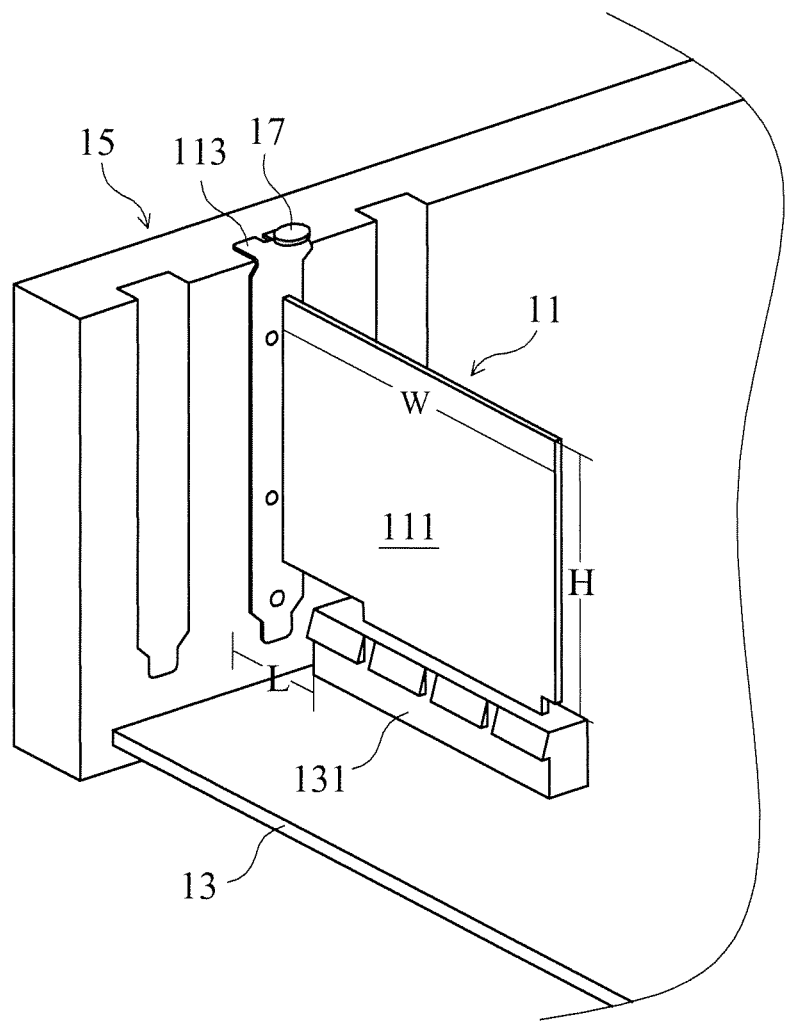
FIG. 1 is a schematic perspective view of a PCIe package according to the prior art.

Further, the baffle 113 used according to the conventional technique indicated in FIG. 1 can be employed to the PCIe packet 30, allowing connection of the PCIe packet 30 to the computer case 15 by means of the baffle 113 and enhancing connection stability between the PCIe packet 30 and the PCIe slot 29.

Figure 4:
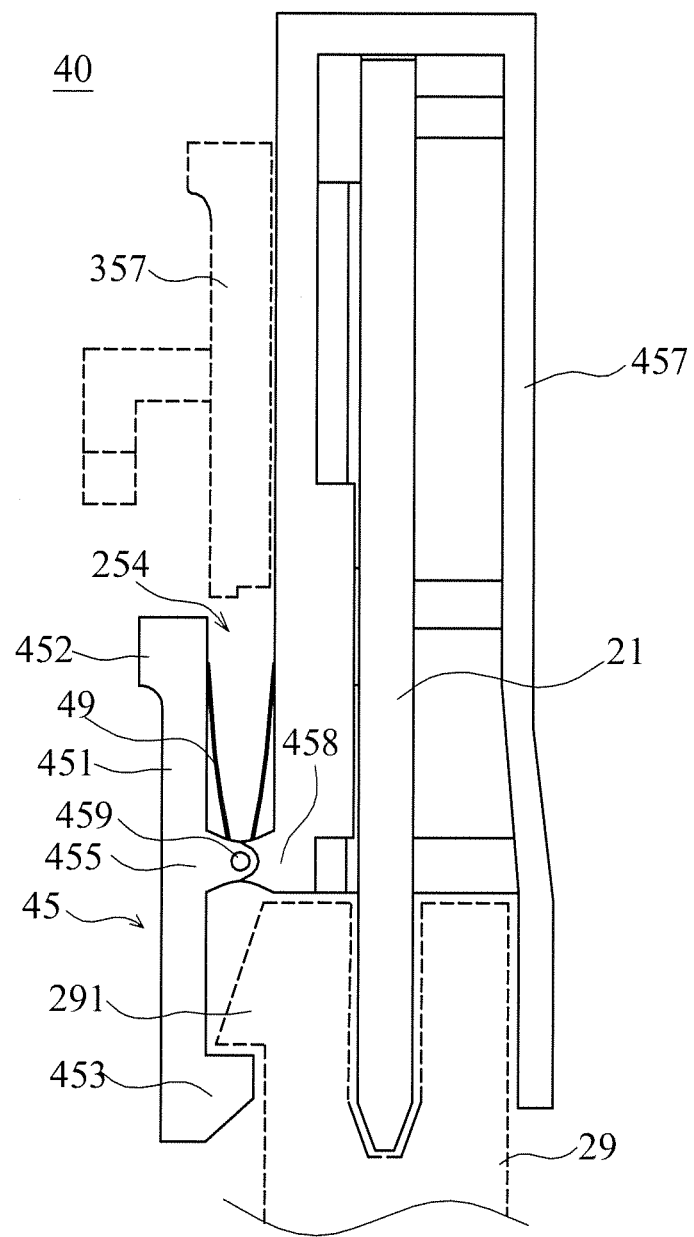
FIG. 4 is a schematic sectional side view of an interface card quick plug-and-unplug device in accordance with a third embodiment of the present invention.

FIG. 4 illustrates a third embodiment of the present invention. According to this third embodiment, the PCIe package, referenced by 40, comprises a PCIe interface card 21 and an interface card quick plug-and-unplug device 45. The interface card quick plug-and-unplug device 45 can be clamped on a PCIe slot 29 to force the engagement member 453 of the interface card quick plug-and-unplug device 45 into engagement with the protruding block 291 of the PCIe slot 29.

According to this third embodiment, the locating member 451 is not formed integral with the shell 457. As illustrated, the locating member 451 comprises a connection means 255 pivotally connected to a connection portion 458 at the shell 457 by a pivot pin 459.

Further, a spring member, for example, a torsion spring 49 is mounted on the pivot pin 459 within the open space 254 and stopped with two opposing ends thereof against the locating member 451 (or the press portion 452) and the shell 457 to impart a biasing force to the locating member 451, forcing the engagement member 453 into engagement with the protruding block 291 of the PCIe slot 29. Further, a positioning member 357 is detachably insertable into the open space 254 to lock the locating member 451 in the engaged position.

Figure 5:
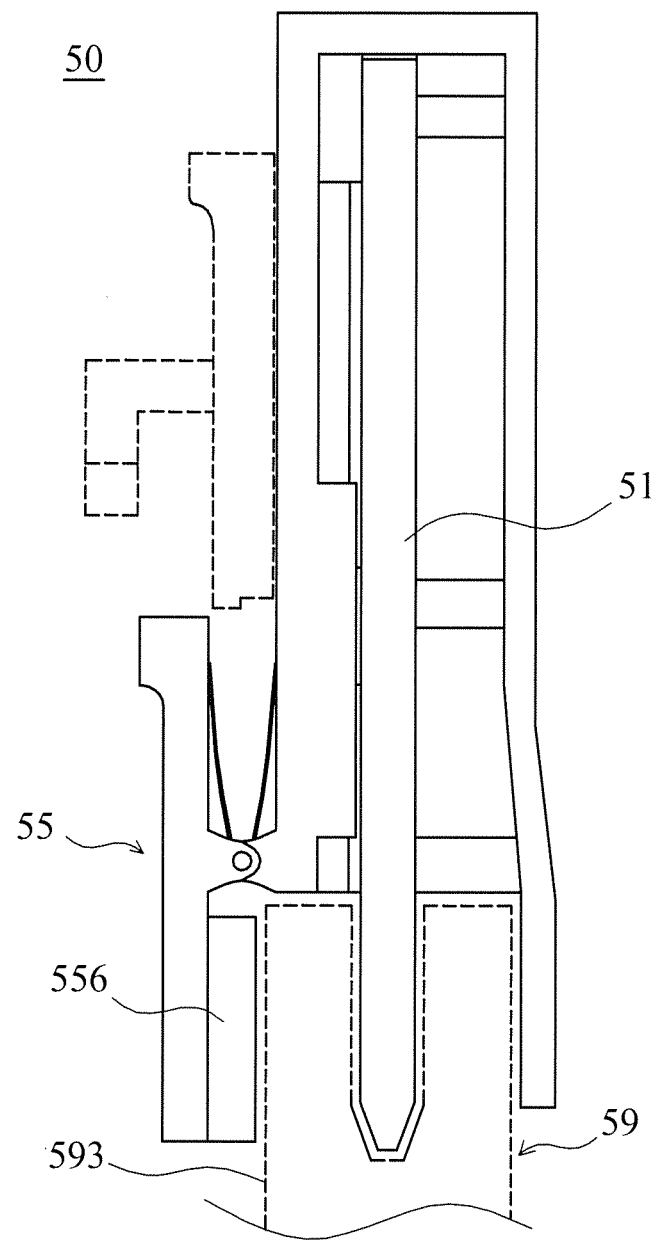
FIG. 5 is a schematic sectional side view of an interface card quick plug-and-unplug device in accordance with a fourth embodiment of the present invention.

FIG. 5 illustrates a fourth embodiment of the present invention. According to this fourth embodiment, the interface card quick plug-and-unplug device, referenced by 55, is used with a PCI interface card 51 to constitute a PCI packet 50 for allowing the PCI interface card 51 to be quickly and positively plugged into a PCI slot 59 and quickly and easily unplugged therefrom.

As a PCI slot 59 does not have the design of the protruding block 291 of a PCIe slot 29, a friction pad 556 is provided at the interface card quick plug-and-unplug device, referenced by 55 for friction engagement with the side wall 593 of the PCI slot 59 to substitute for the aforesaid engagement member 253. The friction pad 556 can be prepared by an anti-slip material, for example, rubber. Subject to the friction resistance produced between the friction pad 556 and the side wall 593 of the PCI slot 59, connection stability between the PCI interface card 51 and the PCI slot 59 is assured.

Figure 6:
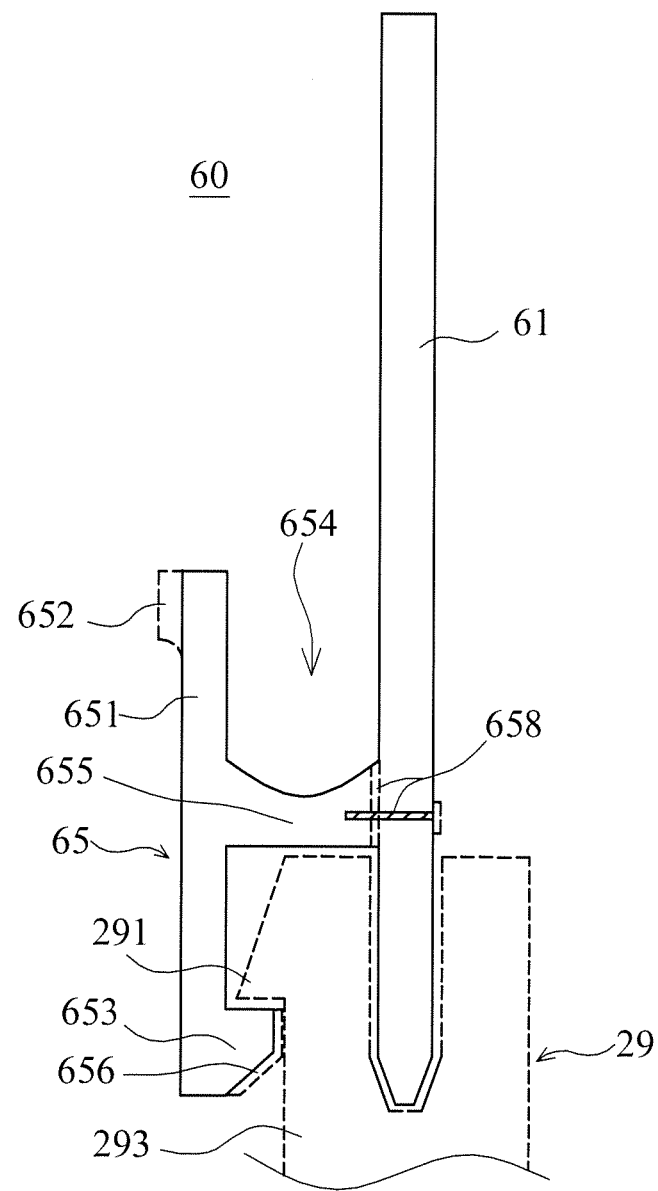
FIG. 6 is a schematic sectional side view of an interface card quick plug-and-unplug device in accordance with a fifth embodiment of the present invention.

FIG. 6 illustrates a fifth embodiment of the present invention. According to this fourth embodiment, the interface card quick plug-and-unplug device, referenced by 65, is connected to one side of the PCIe interface card 61, forming a PCIe packet 60 for allowing the PCIe interface card 61 to be quickly and positively plugged into a PCIe slot 29 and quickly and easily unplugged therefrom. After insertion of the PCIe interface card 61 into the PCIe slot 29, the engagement member 653, which is located on the bottom side of the locating member 651 is forced into engagement with the protruding block 291 of the PCIe slot 29, enhancing connection stability between the PCIe interface card 61 and the PCIe slot 29 is assured.

The interface card quick plug-and-unplug device 65 of this fifth embodiment eliminates the aforesaid shell 257/457. The interface card quick plug-and-unplug device 65 of this fifth embodiment comprises a connection portion 655 extended from the middle part thereof and directly connected to the PCIe interface card 61, leaving an open space 654 between the locating member 651 and the PCIe interface card 61 above the connection portion 655.

Further, a friction pad 656 is fixedly covered on the outer surface of the engagement member 653 for friction engagement with the sidewall 293 of the PCIe slot 29 to enhance connection stability between the PCIe interface card 61 and the PCIe slot 29.

Further, the locating member 651 comprises a press portion 652 at the top side thereof for gripping by the user. The press portion 652 can be block member separately made and then affixed to the locating member 651. Alternatively, the press portion 652 can be a planar part formed integral with the locating member 651.

Further, the connection portion 655 can be formed integral with the PCIe interface card 61. Alternatively, the connection portion 655 can be connected to the PCIe interface card 61 by a soldering joint or snap joint, or by means of fastening means, such as screw, or adhesive.

Figure 7:
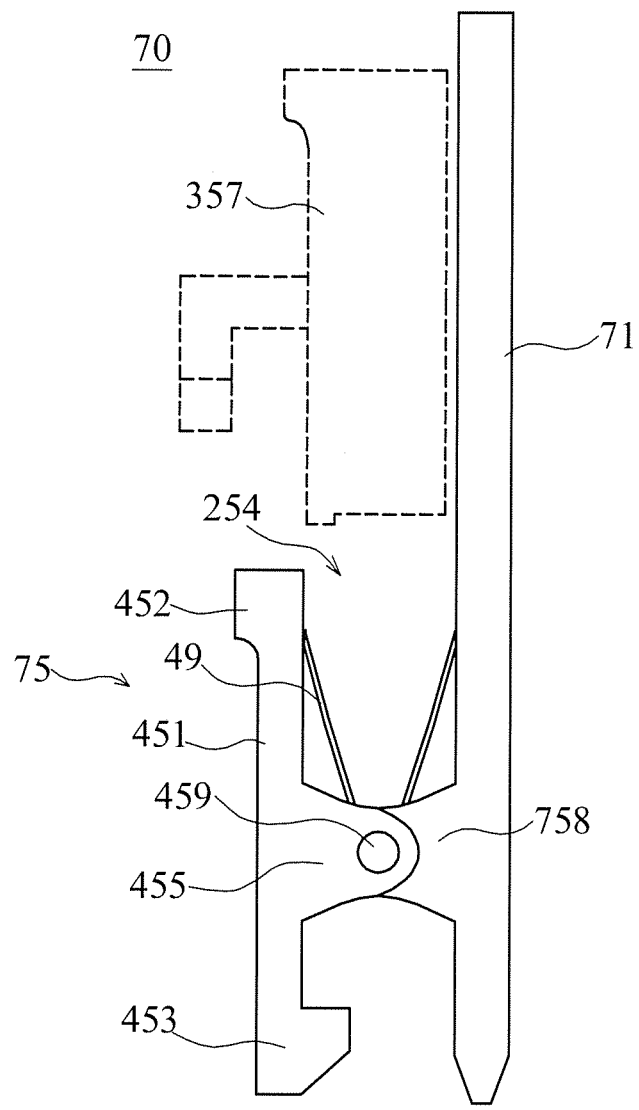
FIG. 7 is a schematic sectional side view of an interface card quick plug-and-unplug device in accordance with a sixth embodiment of the present invention.

FIG. 7 illustrates a sixth embodiment of the present invention. This sixth embodiment is substantially similar to the aforesaid third embodiment shown in FIG. 4 with the exception that this sixth embodiment eliminates the aforesaid shell 457. As illustrated, the interface card quick plug-and-unplug device, referenced by 75, is connected to one side of the PCIe interface card 71, forming a PCIe packet 70. The interface card quick plug-and-unplug device, referenced by 75 comprises a connection portion 455 extended from a middle part of the locating member 451 and pivotally connected to a connection portion 758 at one side of the PCIe interface card 71 by a pivot pin 459, and a spring member, for example, torsion spring 49 mounted on the pivot pin 459 within the open space 254 and stopped with two opposing ends thereof against the locating member 451 (or the press portion 452) and the PCIe interface card 71 to impart a biasing force to the locating member 451. The interface card quick plug-and-unplug device, referenced by 75 further comprises a positioning member 357 for locking the locating member 451 in the engaged position.

Figure 8:
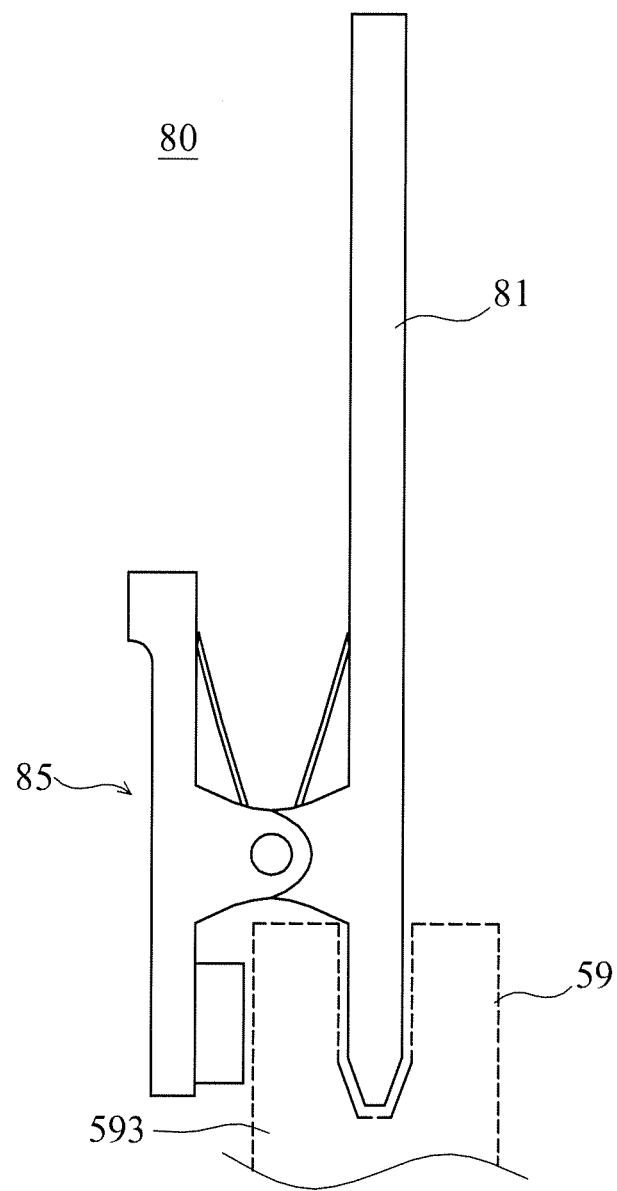
FIG. 8 is a schematic sectional side view of an interface card quick plug-and-unplug device in accordance with a seventh embodiment of the present invention.

The aforesaid fifth and sixth embodiments are used with a PCIe interface card for connection to a PCIe slot. However, these structural designs can also be used with a PCI interface card for connection to a PCI slot. FIG. 8 illustrates a seventh embodiment of the present invention. This seventh embodiment is substantially similar to the aforesaid sixth embodiment shown in FIG. 7 with the exception that the interface card quick plug-and-unplug device, referenced by 85 is connected with a PCI interface card 81, forming a PCI packet 80 for connection to a PCI slot 59.

Figure 9:
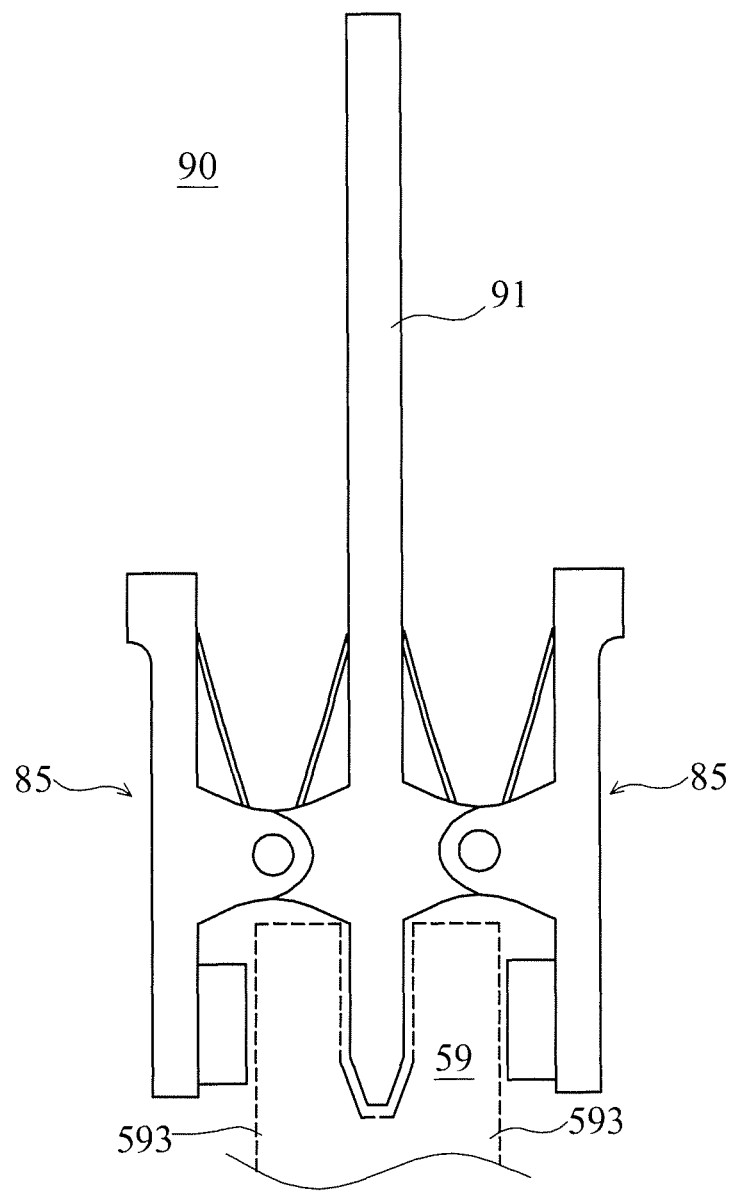
FIG. 9 is a schematic sectional side view of an interface card quick plug-and-unplug device in accordance with an eighth embodiment of the present invention.

FIG. 9 illustrates an eighth embodiment of the present invention. This eighth embodiment is substantially similar to the aforesaid seventh embodiment shown in FIG. 8 with the exception that this eighth embodiment comprises two interface card quick plug-and-unplug devices, referenced by 85 symmetrically connected to two opposing sides of a PCI interface card (or PCIe interface card) 91, forming a PCI (or PCIe) packet 90 for connection to a PCI slot (or PCIe) 59. After insertion of the PCI interface card (or PCIe interface card) 91 into the PCI slot (or PCIe) 59, the two interface card quick plug-and-unplug devices 85 are respectively clamped on two opposite sidewalls 593 of the PCI slot (or PCIe) 59.

For easy understanding of the features of the present invention, PCIe (peripheral component interconnect express) and PCI (peripheral component interconnect) interface cards are introduced for explanation. In actual practice, other interface cards, including PCIX (PCI-eXtended) interface card may be used.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An interface card quick plug-and-unplug device, comprising:
    at least one locating member, each said locating member comprising a connection means connected with a PCIe interface card and an open space defined between said locating member and said PCIe interface card above said connection means;
    a shell securing said PCIe interface card and covering a part of said PCIe interface card, wherein said locating member is disposed at one lateral side relative to said shell, said shell comprises a bottom extension downwardly extended from one sidewall thereof opposite to said locating member, said connection means extends from one side of said locating member and connected to said shell, said shell comprises a guide rail vertically located on one side thereof corresponding to said open space, and a positioning member coupled to said guide rail and movable along said guide rail in and out of said open space; and
    a contact means located on a bottom side of said locating member for engagement with a PCIe slot upon insertion of said PCIe interface card into said PCIe slot.

2. The interface card quick plug-and-unplug device as claimed in claim 1, wherein said contact means is an engagement member extended from the bottom side of said locating member; said PCIe slot comprises at least one protruding block raised from one side thereof for engagement with said engagement member.

3. The interface card quick plug-and-unplug device as claimed in claim 1, wherein said connection means comprises a first connection member extended from said locating member, a second connection member extended from said shell, a pivot pin pivotally connecting said first connection member and said second connection member, and a spring member mounted on said pivot pin and stopped between said locating member and said shell to impart a biasing force to said locating member relative to said shell.

4. The interface card quick plug-and-unplug device as claimed in claim 1, further comprising a positioning member for locking said locating member.

5. The interface card quick plug-and-unplug device as claimed in claim 1, wherein said contact means comprises an engagement member extended from the bottom side of said locating member and a friction pad covered on said engagement member.

6. The interface card quick plug-and-unplug device as claimed in claim 1, wherein said connection means comprises a first connection member extended from said locating member, a second connection member extended from said PCIe interface card, a pivot pin pivotally connecting said first connection member and said second connection member, and a spring member mounted on said pivot pin and stopped between said locating member and said PCIe interface card to impart a biasing force to said locating member relative to said PCIe interface card.

7. An interface card quick plug-and-unplug device, comprising:
    at least one locating member, each said locating member comprising a connection means connected with a PCI interface card and an open space defined between said locating member and said PCI interface card above said connection means;
    a shell securing said PCI interface card and covering a part of said PCI interface card, wherein said locating member is disposed at one lateral side relative to said shell, said shell comprises a bottom extension downwardly extended from one sidewall thereof opposite to said locating member, said connection means extends from one side of said locating member and connected to said shell, and said shell comprises a guide rail vertically located on one side thereof corresponding to said open space, wherein a positioning member, insertable into said open space to lock said locating member, coupled to said guide rail, and movable along said guide rail in and out of said open space; and
    a contact means located on a bottom side of said locating member for engagement with a PCI slot upon insertion of said PCI interface card into said PCI slot.

8. The interface card quick plug-and-unplug device as claimed in claim 7, wherein said connection means comprises a first connection member extended from said locating member, a second connection member extended from said shell, a pivot pin pivotally connecting said first connection member and said second connection member, and a spring member mounted on said pivot pin and stopped between said locating member and said shell to impart a biasing force to said locating member relative to said shell.

9. The interface card quick plug-and-unplug device as claimed in claim 7, wherein said contact means comprises an engagement member extended from the bottom side of said locating member and a friction pad covered on said engagement member.

10. The interface card quick plug-and-unplug device as claimed in claim 7, wherein said connection means comprises a first connection member extended from said locating member, a second connection member extended from said PCI interface card, a pivot pin pivotally connecting said first connection member and said second connection member, and a spring member mounted on said pivot pin and stopped between said locating member and said PCI interface card to impart a biasing force to said locating member relative to said PCI interface card.

* * * * *